US009456323B2

(12) United States Patent
Buschner et al.

(10) Patent No.: US 9,456,323 B2
(45) Date of Patent: Sep. 27, 2016

(54) METHODS AND DEVICES FOR DELIVERY OF NAMING INFORMATION OF A CALLED PARTY TO A CALLING PARTY

(75) Inventors: Stephan Buschner, Aachen (DE); Robert Farac, Herzogenrath (DE); Henning Brandes, Aachen (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1057 days.

(21) Appl. No.: 13/514,651

(22) PCT Filed: Dec. 10, 2010

(86) PCT No.: PCT/EP2010/069339
§ 371 (c)(1),
(2), (4) Date: Jul. 25, 2012

(87) PCT Pub. No.: WO2011/070134
PCT Pub. Date: Jun. 16, 2011

(65) Prior Publication Data
US 2013/0137408 A1  May 30, 2013

Related U.S. Application Data

(60) Provisional application No. 61/285,235, filed on Dec. 10, 2009.

(51) Int. Cl.
| | |
|---|---|
| *H04W 4/16* | (2009.01) |
| *H04Q 3/00* | (2006.01) |
| *H04Q 3/72* | (2006.01) |
| *H04W 36/00* | (2009.01) |

(52) U.S. Cl.
CPC ............ *H04W 4/16* (2013.01); *H04Q 3/0029* (2013.01); *H04Q 3/72* (2013.01); *H04Q 2213/13097* (2013.01); *H04Q 2213/13098* (2013.01); *H04Q 2213/13102* (2013.01); *H04Q 2213/13103* (2013.01); *H04Q 2213/13175* (2013.01); *H04Q 2213/13345* (2013.01); *H04W 36/00* (2013.01)

(58) Field of Classification Search
CPC ..................................................... H04W 4/16
USPC ............... 455/415, 406; 379/142.01, 142.06, 379/221.01, 880.12
See application file for complete search history.

(56) References Cited

U.S. PATENT DOCUMENTS

| | | | |
|---|---|---|---|
| 2003/0147518 A1* | 8/2003 | Albal et al. | 379/207.15 |
| 2003/0179866 A1* | 9/2003 | Stillman et al. | 379/88.19 |
| 2004/0120493 A1* | 6/2004 | Creamer et al. | 379/207.08 |
| 2007/0064886 A1* | 3/2007 | Chiu et al. | 379/88.17 |
| 2009/0193512 A1 | 7/2009 | Buckley | |

FOREIGN PATENT DOCUMENTS

| | | |
|---|---|---|
| JP | 2008022241 A | 1/2008 |
| KR | 20080060202 A | 7/2008 |

* cited by examiner

*Primary Examiner* — Michael T Vu
(74) *Attorney, Agent, or Firm* — Patent Portfolio Builders, PLLC

(57) ABSTRACT

Methods and devices for providing naming information of a called party to a circuit-switched mobile terminal (300, 600, 900, 1000) of a calling party via a mobile telecommunication network are described. In particular, a method performed by a circuit-switched switching node (310, 610, 910, 1010) comprises the steps of receiving (S100) from the mobile terminal a request for setting up a call to a terminal (340, 640, 940-948) of the called party, obtaining (S110) an identifier of the called party, sending (S120) a request for naming information of the called party to a database (330, 630, 930, S22, S33) wherein the naming information of the called party is registerable in association with the called party identifier, the request comprising the identifier, receiving (S130) the naming information from the database, and executing (S140) a delivery of the naming information to the mobile terminal.

47 Claims, 8 Drawing Sheets

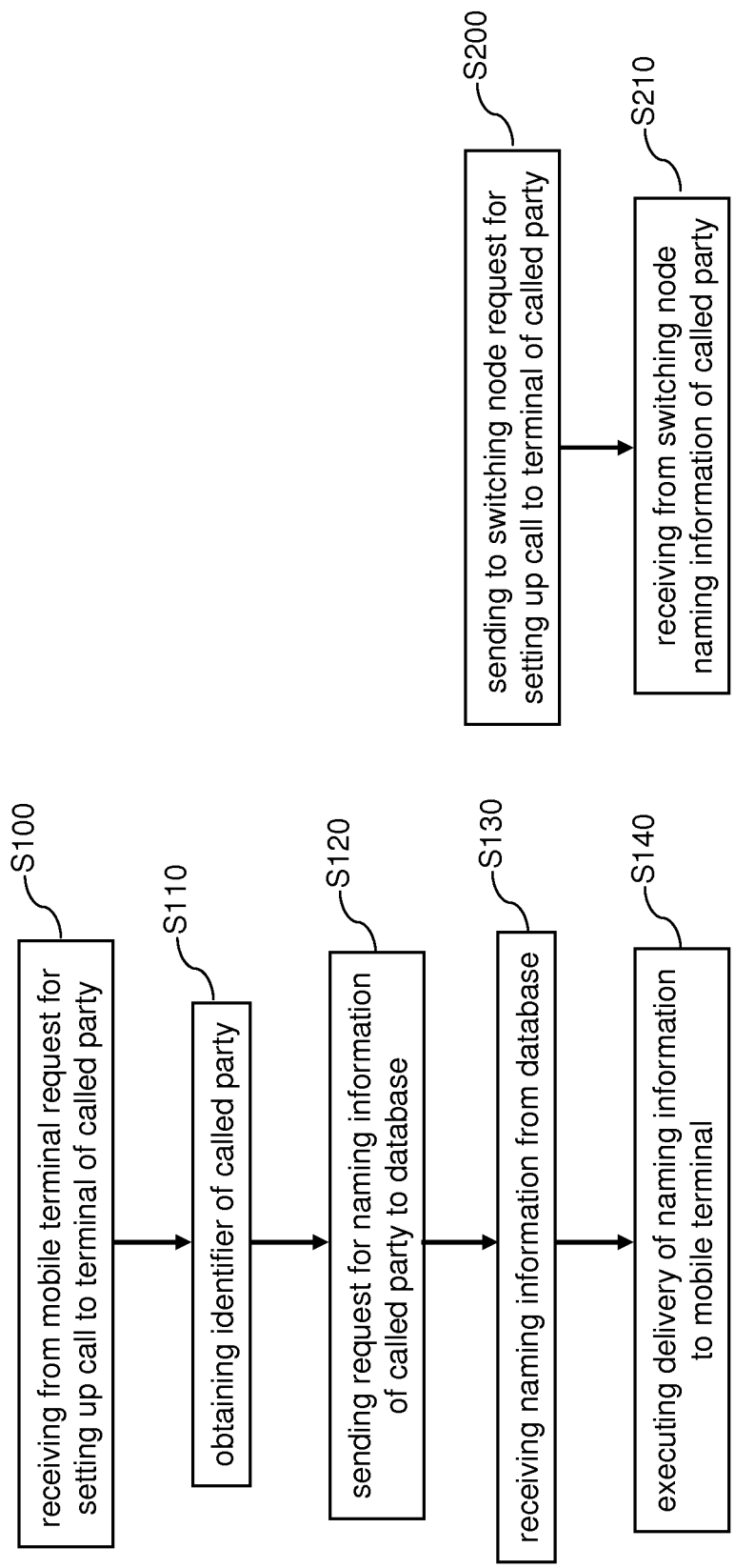

METHODS AND DEVICES FOR DELIVERY OF NAMING INFORMATION OF A CALLED PARTY TO A CALLING PARTY

TECHNICAL FIELD

The present invention relates to telecommunication, in particular to methods and devices or providing naming information of a called party to a circuit-switched mobile terminal of a calling party via a mobile telecommunication network.

BACKGROUND

An Address book comprising names and contact information of parties to be contacted may be a primary starting point for mobile calls. Examples for contact information are identifiers such a phone numbers or email-addresses of the party in the address book typically associated to the name of the party in the address book but also information like street, zip-code, town, state, country etc. Existing address book solutions are mainly aimed at IP Multimedia Subsystem (IMS) operators and usable only with smart phones and require considerable CAPital Expenditure (CAPEX). An example for such an address book is the Ericsson Active Address Book product (AAB), see e.g. online Ericsson Product Catalogue, which is a high-end implementation for mobile phone address book synchronization features. Today the address book market for circuit-switched phones is mainly determined by back-up and restore functionality.

When intending to make a phone call to a called party, the calling party can look up the called party's entry in the address book in the phone and then dials the number. The number may be automatically dialled by the phone when e.g. clicking an appropriate button activating a dialling function on the phone for setting up a call to a called party.

If there is no entry in the phone, then the user as calling party needs to determine the number of the called party, e.g. from a phone book or from an operator or just from his/her memories, and enters this number into the phone to set-up a call to the called party. In many phones, the dialled phone number is added to the outgoing call list in the phone.

When making calls also to other called parties, further phone numbers will be added to the list.

Later, wanting to make a phone call to any of the previously called parties, the calling party again does not find an entry in his/her address book because the called party may not have typed in the called party into his/her address book. Further, the calling party may not be able to recognize the phone number of the called party from the outgoing call list, e.g. because the list is very long and/or just because the list contains very similar phone numbers which might confuse the calling party which may lead to calls to wrong called parties. Or, the calling party has once again turn to the operator or paper phone book as described above. All in all, existing approaches are quite complex and not very user-friendly and can be even costly if the calling party has to turn to the operator to request once more the phone number of a previously called party.

SUMMARY

It is therefore a desire to provide methods, devices, a system, and computer programs that overcome at least some of the aforementioned drawbacks.

This object is achieved by the independent claims. Advantageous embodiments are described in the dependent claims.

In one aspect, a method for providing naming information of a called party to a circuit-switched mobile terminal of a calling party via a mobile telecommunication network is provided. The method comprises the steps performed by a circuit-switched switching node of receiving from the mobile terminal a request for setting up a call to a terminal of the called party, of obtaining an identifier of the called party, and of sending a request for naming information of the called party to a database. The naming information of the called party is registerable in the database in association with the called party identifier and the request comprises the identifier, The method comprises the further steps performed by the circuit-switched switching node of receiving the naming information from the database and of executing a delivery of the naming information to the mobile terminal.

In yet another aspect, a circuit-switched switching node adapted to perform the steps of the method described before is provided. The circuit-switched switching node may comprise a receiving unit for receiving messages, a transmitting unit for sending messages, and a processing unit for processing messages and information. Information may be stored in or retrieved from a database. For example, the receiving unit may be adapted to receive from the mobile terminal a request for setting up a call to a terminal of the called party. The processing unit may be adapted to obtain an identifier of the called party. The transmitting unit may be adapted to send a request for naming information of the called party, the request comprising the identifier, to a database wherein the naming information of the called party is registerable in association with the called party identifier. The receiving unit may be further adapted to receive the naming information from the database and the processing unit may be adapted to execute a delivery of the naming information via the transmission unit to the mobile terminal.

In yet another aspect, a computer program to be executed by a processing unit of a circuit-switched switching node is provided. The computer program comprises code adapted to perform the steps of the method described before.

In yet another aspect, a method for providing naming information of a called party to a circuit-switched mobile terminal of a calling party via a mobile telecommunication network is provided. The method comprises the steps performed by the circuit-switched mobile terminal of sending to a circuit-switched switching node a request for setting up a call to a terminal of the called party and of receiving from the switching node naming information of the called party.

In yet another aspect, a circuit-switched mobile phone adapted to perform the steps of the method described before is provided. The mobile terminal may comprise a receiving unit for receiving messages, a transmitting unit for sending messages, and a processing unit for processing messages and information. Information may be stored in or retrieved from a database. The mobile terminal may further comprise an output unit for presenting the received called party naming information to the calling party, e.g. a display of a mobile phone showing an outgoing call list. For example, the transmitting unit may be adapted to send to a circuit-switched switching node a request for setting up a call to a terminal of the called party and the receiving unit may be adapted to receive from the switching node naming information of the called party.

In yet another aspect, a computer program to be executed by a processing unit of a circuit-switched mobile terminal is provided. The computer program comprises code adapted to perform the steps of the method described before.

In yet another aspect, a computer program product comprising the computer program(s) as described before is provided.

In yet another aspect, a telecommunication system is provided. The telecommunication system comprises the circuit-switched switching node as described before, a circuit-switched mobile terminal as described before, and a database wherein naming information of a called party is registerable in association with an identifier of the called party.

In the following, detailed embodiments of the present invention shall be described in order to give the skilled person a full and complete understanding. However, these embodiments are illustrative and not intended to be limiting.

BRIEF DESCRIPTION OF THE DRAWINGS

FIG. 1 shows an example for a flowchart comprising method steps performed at a circuit-switched switching node;

FIG. 2 shows an example for a flowchart comprising method steps performed at a circuit-switched mobile terminal of a calling party;

DETAILED DESCRIPTION

Figure 3:
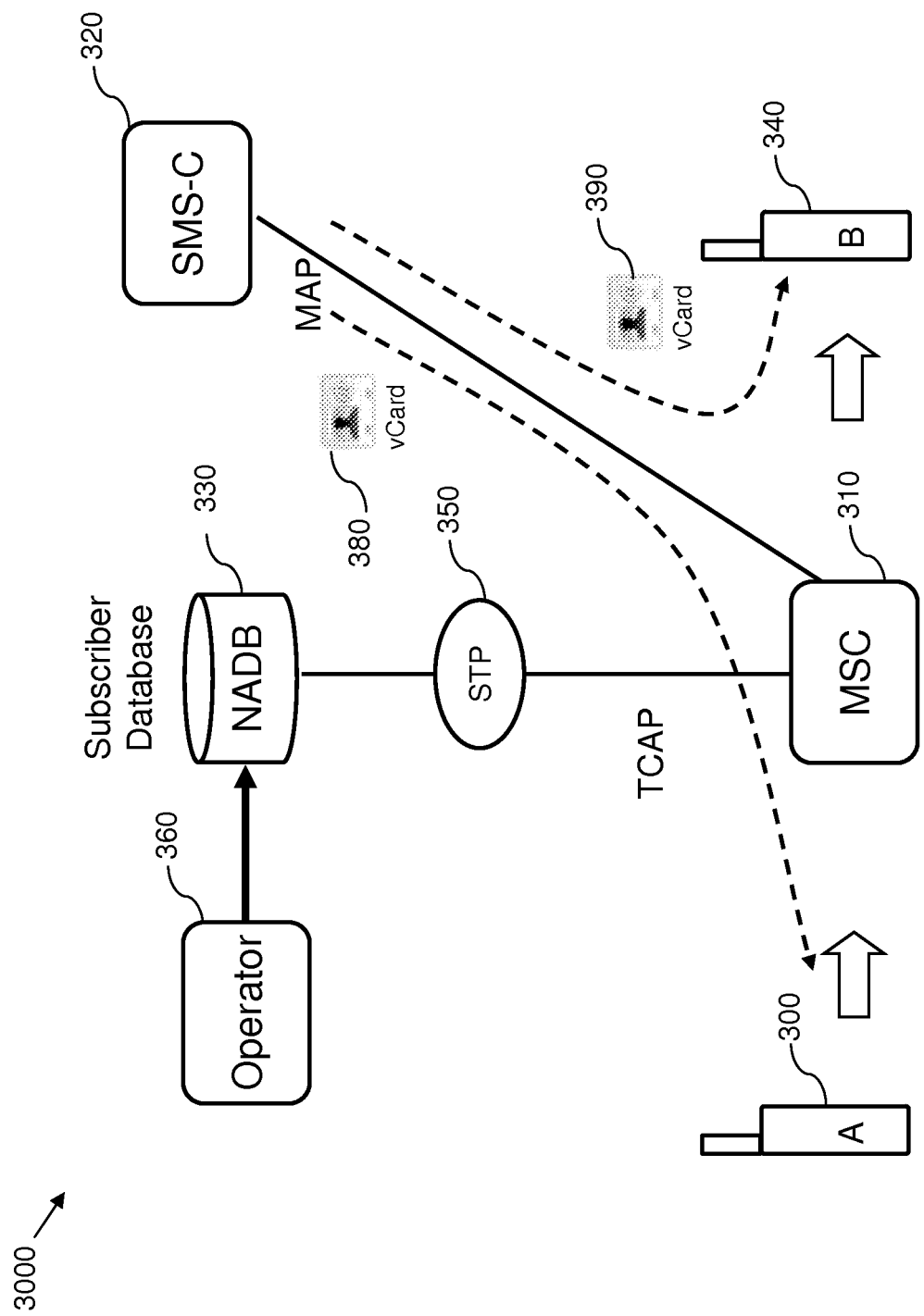
FIG. 3 shows a schematic illustration of a first embodiment of a mobile telecommunication network for implementing the invention.

In the following, the invention will be explained in more detail by referring to exemplary embodiments and to the accompanying drawings. It is to be understood that the examples and embodiments as explained below are merely illustrative and susceptible to various modifications.

The invention is embodied in a method for providing naming information of a called party to a circuit-switched mobile terminal of a calling party via a mobile telecommunication network. An example for a flowchart comprising method steps performed at a circuit-switched switching node such as a Mobile Switching Center (MSC) or Mobile Switching Center Server (MSC-S) and an example for a flowchart comprising method steps performed at a mobile terminal of a calling party are depicted in FIG. 1 and FIG. 2, respectively.

For illustrative purpose, the following description of FIG. 1 and FIG. 2 make reference to features presented in further figures, e.g. for a mobile terminal of a calling party such as terminal(s) 300, 600, 900, 1000, a terminal of a called part such as terminal(s) 340, 640, 940-948, a switching node such as node(s) 310, 610, 910, 1010, a database such as database(s) 330, 630, 930, S22, S33, or a text message delivery service center such as center(s) 320, 620, 920 or messages between such devices.

The method may start by receiving S100 from a mobile terminal of a calling party a request (e.g. Call Setup such as message(s) M300, M600) for setting up a call to a terminal of the called party. A further step of obtaining S110 an identifier (e.g. a B-number, also abbreviated herein as B-nbr) of the called party is executed. In addition, the method comprises sending S120 of a request (e.g. Transaction Capabilities Application Part (TCAP) Subscribe or TCAP Get or Session Initiation Protocol (SIP) Subscribe or Extensible Markup Language (XML) Configuration Access Protocol (XCAP) Get such as message(s) M310 or M330 or M610 or M630, respectively) for naming information of the called party to a database (e.g. Name Data Base (NADB) or Presence, Group & Data Management (PGM) database such as 330 or 630, respectively or database 930) wherein the naming information of the called party is registerable in association with the called party identifier. The request comprises the identifier. A step of receiving S130 (e.g. via 200 OK (vCard) such as message(s) M335, M635) the naming information from the database is executed followed by executing S140 a delivery (e.g. via Mobile Application Part (MAP) Mobile Originating (MO) Forward Short message (SM) and MAP Mobile Terminating (MT) Forward SM messages and Short Message Service (SMS) (vCard of callee) such as message(s) M340, M345, and M350 or M640, M645, and M650) of the naming information to the mobile terminal.

Naming information of a party comprises a name of said party, e.g. naming information of a called party comprises a name of the called party. The name does not have to be the real name of the party, e.g. could be also a nick name. The naming information of a party may comprise more than one name of that party, e.g. real name and nick name. A party's name may be already associated with an identifier of that party, e.g. the name of a called party may be associated with the called party identifier (e.g. B-nbr) constituting an example for naming information comprising a name and an identifier of the called party. A vCard, a virtual address card (electronic business card), may be an illustrative example for such kind of naming information comprising name and contact information (phone number, address etc), i.e. an example for party naming information being associated with a corresponding party identifier. The naming information of the called party is registerable in association with the called party identifier, i.e. the party naming information and the corresponding party identifier are typically registered at the database (e.g. in terms of a vCard or simply in two columns of a table) before any call set-up to the party in question is made, however, there might be implementations, wherein such data is collected when a call set-up to said party is recognized by the switching node or at any further future availability.

An association of naming information with an identifier of the called party or the call itself may be alternatively or in addition possible at the calling party mobile terminal for improving the usability of the legacy mobile phone, e.g. the name of the called party maybe provided to the mobile phone during call set-up or making the call. In that case, the mobile terminal may be configured to simply replace the phone number of the called party which is on top of the outgoing call list by the received name. Hence, a timely correlation of the outgoing call and the received naming information may be used to build an association at the mobile phone. Alternatively or in addition, an association may be build at the mobile terminal based on a correlation of a naming information and a call identifier of the call to the terminal of the called party such that the mobile terminal can relate the received naming information to the call identifier, e.g. to replace the phone number in the outgoing call list with the phone number being correlated with the call identifier in an underlying database of the mobile phone (call ID is typically not visible in the outgoing list) by the naming information correlated with the call identifier as received from the switching node. Alternatively or in addition, the naming information already comprises the identifier of the called party that is used for the call set-up (e.g. B-number) which may be preferred in terms of ease and security of the implementation as the association is already provided to the mobile terminal of the calling party which then simply needs to search the outgoing call list for entries with the identifier as comprised in the naming information and to replace that identifier by the name of the naming information.

The method may further comprise that the request (e.g. Call Setup (B-nbr) such as message(s) M300, M600)) from the mobile terminal comprises the identifier and the identifier is obtained S110 by the switching node from said request. The identifier of the request (1) from the mobile terminal and of the request (2) from the switching node to the database can be identical or not. In the first case obtaining S110 may be performed by extracting the identifier from the request (1) and the identifier of the request (2) may be a copy of the identifier of the request (1) which is an efficient implementation. It may be of advantage, e.g. from privacy and/or administration point of view, if the switching node uses different identifiers for call set-up and for identification of the called party at the naming information database. In this latter case the obtaining may comprise a step to retrieve the identifier used for the request (2) for the naming information from a correlation of the two identifiers, e.g. by a look up of the identifier for the naming information database in a database correlating identifiers used in call set-up messages such as request (1) with identifiers used at naming information databases such as used for request (2). One or more messages may be sent in conjunction with the call set-up. The identifier may be part of or attached to at least one message that may be sent for setting up a call.

The method may further comprise the step performed by the switching node of receiving a request (e.g. USSD: "vCard trigger" such as message(s) M307, "USSD" stands for Unstructured Supplementary Service Data) for the naming information from the mobile terminal triggering the step of sending 120 the request (e.g. TCAP Subscribe or TCAP Get or SIP Subscribe or XCAP Get such as message(s) M310 or M330 or M610 or M630, respectively) for the naming information of the called party to the database.

The method may further comprise the following steps performed by the switching node of receiving in response to the sending S120 of the request (e.g. TCAP Subscribe or SIP subscribe such as message(s) M310 or M610, respectively) for naming information a notification (e.g. TCAP Notify or SIP Notify such as message(s) M315 or M615, respectively) indicating information regarding an availability of the requested naming information at the database and of sending a request (e.g. TCAP GET or XCAP GET such as message(s) M330 or M630, respectively) for actually transferring the naming information from the database in accordance with the indicated availability information. The availability information may indicate that the requested information is available or not at the database. In the latter case, the switching node may terminate the procedure or may turn to another naming information database for requesting the called party naming information. Alternatively, the availability information may indicate itself information to the switching node regarding an alternative database where the requested called party information is requestable and obtainable from. Alternatively, the availability information may indicate a point in time when the requested information will be available such that the switching node can schedule the following steps accordingly (e.g. because a time delay is introduced because the database needs to communicate with the called party regarding an updating of the registered called party information and/or an authorization of the sending of the called party information to the switching center and/or to the mobile terminal of the calling party (for the latter case, an identifier (e.g. A-number, also abbreviated herein as A-nbr) of the calling party may be known to the database, see in particular next paragraph below. The database may have stored also an identifier of the calling party associated with naming information of the calling party for indication to the called party such that the called party knows about the calling party. For example Intelligent Networks (IN) Calling NAme Presentation (CNAP) mechanisms may be used for indicating the calling party name to the called party which is a Customized Applications for Mobile networks Enhanced Logic (CAMEL) IN service for presenting a name of a calling party at the terminal of a called party. If the called party information is available (or will be), the availability (or future availability) may be indicated by the notification message with an identifier (e.g. a Uniform Resource Identifier (URI) with optional entity tag (etag)) of the called party naming information and the switching node can analyze the received availability information and can proceed accordingly towards the delivery of the called party naming information. The reception of such kind of notification message can be of advantage, because when the calling party denies the acceptance of the delivery (e.g. by sending an appropriate acceptance specification, see further down for a more detailed description of the acceptance specification), the called party naming information does not have to be disclosed by the database to the switching node such increasing the security of the method in terms of privacy.

The method may further comprise the steps performed by the switching node of sending an identifier (e.g. A-nbr) of the calling party to the database wherein the naming information of the called party is stored in association with the calling party identifier and of receiving from the database a notification (e.g. TCAP Notify or SIP Notify such as message(s) M315 or M615, respectively) comprising a delivery status of the requested naming information to the mobile terminal. The delivery status may indicate whether the naming information of this called party has already been delivered to the mobile terminal of the calling party before or not. In the first case, the switching node may not proceed towards the delivery of the called party information to the mobile terminal thus saving messages and reducing load of the circuit-switched (CS) telecommunication network and of the involved devices. It may alternatively turn to the mobile terminal asking for an acceptance specification of the delivery. The delivery status may alternatively or in addition indicate a time when the called party information has already been delivered to the mobile terminal. In this case, the switching node may terminate the procedure (or turns to the mobile terminal for requesting acceptance specification and proceed then accordingly). Alternatively in this case, the switching node may analyze the time and proceeds towards the delivery of the called party naming information if the time is found to be above a predefined threshold time value (e.g. to avoid that the mobile device is repetitively provided with the called party naming information and/or requests for acceptance specification for repeating calls to the same called party on the one hand and on the other hand to provide a certain possibility to update called party naming information that may occur after certain time has passed). The calling party identifier can be sent along with the called party identifier by one or more messages, e.g. both A- and B-nbrs may be contained in Call Setup message (such as message(s) M300, M600 or M305, M605) and/or TCAP Subscribe (such as message(s) M310) and/or SIP Subscribe (such as message(s) M610).

The method may further comprise the step performed by the switching node of receiving an acceptance specification (e.g. USSD: "Yes" such as message(s) M325, M625) from the mobile terminal specifying information regarding an acceptance for the delivery of the naming information to the mobile terminal. The calling party terminal may not for all calls or all calling parties receive called party naming information which maybe especially useful for a selective delivery (e.g. an acceptance specification may be negative if the calling party is roaming as the delivery of the called party naming information can be costly whereas the acceptance specification may be in the affirmative if the calling party terminal does not have the calling party information or, if available, the available called party naming information at the mobile terminal is outdated or just because the calling party user has an interest in the delivery. Hence, if the acceptance specification is determined to be in the affirmative, the switching node may proceed further towards the delivery.

The method may further comprise the step performed by the switching node of sending a request (e.g. USSD: "Accept vCard?" such as message(s) M320, M620) for the acceptance specification to the mobile terminal. The switching node may use a request-response scheme which may be easy to implement.

A request for acceptance specification such as message M320, M620 is typically indicated to the calling party at the calling party's terminal such as 300, 600. Such an indicated request for acceptance specification may be also denoted as availability indicator, which, when activated by entering appropriate acceptance specification information (e.g. "Yes" is typed into the mobile terminal), triggers the sending of the acceptance specification such as message M325, M625 to the switching node such as 310, 610.

According to an embodiment, the request for acceptance specification may trigger the mobile terminal to indicate an availability indicator of the called party naming information associated with the called party identifier. An activation of the availability indicator may trigger the sending of the acceptance specification from the mobile terminal.

The availability indicator may be presented (as an example for an indication) at an output unit of the calling party terminal to the calling party for a later activation and thus sending of the acceptance specification effecting in the end that the switching node executes the delivery of the called party naming information to the calling party mobile terminal principally at any time (if not any temporal restrictions might be applied from e.g. network side). If the naming information is not already available (or no longer available) to the switching node, the receipt of the acceptance specification may trigger requesting said naming information from the database before the switching node can execute the delivery (of course, the availability might be checked (again) at the database before actually requesting the transfer of the naming information). For example, during set-up, during call, or after call termination of a call from a calling party mobile terminal to a called party terminal an icon (as an example for an availability indicator) may be added to the number of the called party in the outgoing call list. The calling party user may click (as an example for an activation) on the icon to request sending of e.g. a vCard with e.g. name and other contact information to the calling party terminal to be associated with the called party number in the called party phone list, e.g. the phone number of the called party might be replaced by the name of the called party. Alternatively or in addition, the received vCard may be stored in the address book on the calling party mobile terminal. Usually, the calling party will activate the availability indicator after the call. The association of the availability indicator with the called party identifier, especially in an outgoing call list, may be accomplished in a similar manner as described for the association of the naming information to the called party identifier, e.g. based on correlation between called party identifiers, a temporal correlation of the call and the reception of the request for acceptance specification, or a correlation of call IDs. For example, the request for acceptance specification may comprise the called party identifier which can be correlated with the one available to the mobile terminal when setting-up the call and present in the outgoing call list to which the availability indicator could be added based on the correlation.

The method may further comprise the steps performed by the switching node of obtaining an identifier uniquely identifying the call to the mobile terminal and wherein the step of executing (S140) the delivery comprises delivering the called party naming information and the call identifier so as to allow the mobile terminal to associate the called party naming information with the call to the calling party. The call identifier may be communicated during call set-up from the mobile terminal to the switching node (e.g. then the switching node obtains the call identifier by receiving it from the mobile terminal) or the call identifier is determined by the switching node and sent to the mobile terminal. The called party naming information and the call identifier are preferably delivered by the same message or a set of message allowing the mobile terminal to determine the association of the called party naming information and the call identifier there from. This embodiment enables the mobile terminal to relate the called party name information to a particular call.

The step of executing S140 the delivery may comprise delivering of the called party naming information and the called party identifier so as to allow the mobile terminal to associate the called party naming information with the called party identifier. This embodiment enables the mobile terminal to relate the called party name information to the called party identifier, e.g. the mobile terminal may thus be adapted to replace in the outgoing call list the called party identifier used for the call set-up (e.g. B-nbr=phone number of called party) by the received called party naming information or parts therefore (e.g. replace B-nbr by name of called party). Note, a vCard typically comprises, inter alia, name and phone number of the called party. The called party naming information and the called party identifier are preferably delivered by the same message or a set of messages allowing the mobile terminal to determine the association of the called party naming information and the called party identifier therefrom. Alternatively or in addition, the step of executing S140 the delivery may comprise sending of the naming information in a format suited for incorporation in a text message to a text message delivery service center, receiving from the text message delivery service center (e.g. Short Message Service Center (SMS-C) such as 320, 620, or 920) of a text message comprising the naming information, and sending of the text message to the mobile terminal (such as message(s) M350, 650). Using a text format eases the implementation especially for legacy CS circuit switched mobile terminals which are adapted to process text-based messages e.g. for presentation to the calling party or storing in an address book.

The method may further comprise the steps performed by the switching node of obtaining naming information of the calling party and an identifier of the calling party and of sending the calling party naming information and the calling party identifier to the database so as to allow to associate the calling party naming information with the calling party identifier for registering the calling party at the database. The calling party may itself register at the database such that this naming information can be delivered as called party information when said calling party is called. The naming information and the identifier may be obtained by e.g. receiving this information from the mobile terminal (e.g. via USSD) or another terminal of the calling party, e.g. via a PC sending this info to a web-interface of the switching node. Alternatively or in addition, the naming information and the identifier may be registered from the mobile terminal or another terminal of the calling party at the database without involvement of the switching node (e.g. via webtool). One or more of the aforementioned registration possibilities are open in principle to any party, e.g. also the called party might register it's naming information and party identifier accordingly.

At least one of the called party naming information and the calling party naming information may be in accordance with a vCard, at least one of the requests or messages communicated between the switching node and the database may be in accordance with the TCAP and/or IN Application Part (INAP) (e.g. as used in IN CNAP) and/or SIP and/or XCAP protocol, and/or at least one of the requests or messages communicated between the switching node and the mobile terminal may be in accordance with the USSD protocol. According to another embodiment, the method may further comprise the step of determining a termination of the call, a busy state of the called party terminal, or a call-non-acceptance state by the called party terminal. This determination step is typically performed by the switching node. If determined accordingly, said sending S120 of said request for naming information of the called party to the database may be triggered. Alternatively or in addition, said sending of said request for the acceptance specification and/or said executing S140 of said delivery of the naming information to the mobile terminal may be triggered by said determination. Hence, calling party disturbance (e.g. by noise indicating received message(s) or interaction for entering appropriate acceptance specification information) during call set-up or call can be minimized as will be explained in more detail also further below.

Referring now to FIG. 2 presenting an example for a method for providing naming information of a called party to a circuit-switched mobile terminal of a calling party via a mobile telecommunication network. The method is performed by the mobile terminal and may start by a step of sending S200 to a circuit-switched switching node (e.g. MSC-S such as 310, 610, 910) a request (e.g. Call Setup such as message(s) M300, M600)) for setting up a call to a terminal of the called party followed by a step of receiving S210 from the switching node naming information of the called party. As explained already in more detail above, the naming information of the called party is obtainable for the switching node at a database (e.g. NADB or PGM such as 330, 630 or database 930) wherein the naming information of the called party is registerable in association with a called party identifier.

The request (e.g. Call Setup (B-nbr) such as message(s) M300, M600)) may comprise an identifier of the called party. The method may further comprise the step performed by the mobile terminal of sending a request (e.g. USSD: "vCard trigger" such as message(s) M307) for the naming information to the switching node for triggering the switching node to request (e.g. TCAP Subscribe or TCAP Get or SIP Subscribe or XCAP Get such as message(s) M310 or M330 or M610 or M630, respectively) the naming information of the called party at a database (e.g. NADB or PGM such as 330, 630 or database 930) wherein the naming information of the called party is registerable in association with a called party identifier.

The method may further comprise the following step performed by the mobile terminal of sending to the switching node an acceptance specification (e.g. USSD: "Yes" such as message(s) M325, M625) specifying information regarding an acceptance for the delivery of the naming information to the mobile terminal.

The method may further comprise the following step performed by the mobile terminal of receiving from the switching node a request (e.g. USSD: "Accept vCard?" such as message(s) M320, M620) for the acceptance specification.

The method may further comprise that request for acceptance specification triggers the mobile terminal to indicate an availability indicator of the called party naming information associated with the called party identifier. An activation of the availability indicator may trigger the sending of the acceptance specification to the circuit-switched network node.

The method may further comprise the step performed by the mobile terminal of obtaining an identifier uniquely identifying the call to the mobile terminal. The step of receiving S210 from the switching node the naming information of the called party may comprise receiving the call identifier. The method may further comprise the step performed by the mobile terminal of associating the called party naming information with the call to the calling party based on a matching of the obtained identifier and the received call identifier.

The step of receiving S210 from the switching node the naming information of the called party may comprise receiving the called party identifier. The method may further comprise the step performed by the mobile terminal of associating the called party naming information with a called party identifier associated with the call at the mobile terminal based on a matching of the obtained called party identifier and the received called party identifier.

The step of associating may comprise steps of adding or of attaching to but also of replacing, e.g. for replacing the called party number in an outgoing call number list by the name of the called party. Matching means typically determining that two identifiers are identical, or at least a relation between them is determinable, which, when determined, triggers the association step.

The step of receiving S210 from the switching node the naming information of the called party may comprise receiving from the switching node a text message (e.g. SMS (vCard of callee) such as message(s) M350, M650) comprising the naming information.

The method may further comprise the steps performed by the mobile terminal of obtaining naming information of the calling party and an identifier of the calling party and sending the calling party naming information and the calling party identifier to the database so as to allow to associate the calling party naming information with the calling party identifier for registering the calling party at the database. The calling party name information and the calling party identifier may be sent to the database via the switching node or not via the switching node.

The method may further comprise that at least one of the steps of said receiving of said request for the acceptance specification and said receiving S210 from the switching node said naming information is performed after a termination of the call, a busy state of the called party terminal, or a call-non-acceptance state by the called party terminal is determined.

At least one of the called party naming information and the calling party naming information may be in accordance with a vCard and/or at least one of the requests or messages communicated between the switching node and the mobile terminal may be in accordance with the USSD protocol. Communication between the mobile terminal of the calling party and the switching node may alternatively or in addition to USSD performed by SMS. However, this is a rather costly implementation compared to USSD.

Steps of the methods as described above may be performed in the described order or ordered differently.

Hence, a call-triggered mechanism for delivering naming information of a called party to a circuit-switched mobile terminal of a calling party may be provided.

The actual triggers for the individual steps of the method may vary. For example, it can be of advantage if the calling party terminal does not receive any disturbing communication, e.g. a request (e.g. USSD: "Accept vCard?" such as message(s) M320, M620) for the acceptance specification to the mobile terminal or the naming information itself that is indicated during the call in a perceivably disturbing manner, e.g. a loud tone. Hence, it can be of advantage to postpone this communication to a point in time following the termination of the call. e.g. a call-termination message would trigger the step of sending S120 a request (e.g. TCAP Subscribe or TCAP Get or SIP Subscribe or XCAP Get such as message(s) M310 or M330 or M610 or M630, respectively) for naming information to a database (e.g. NADB or PGM such as 330 or 630, respectively or database 930) wherein the naming information of the called party is registerable in association with the called party identifier and thus following steps or messages as e.g. depicted in FIGS. 4, 5, and 7.

An alternative beneficial implementation in that sense with minimal user disturbance during call time would be to use the request (e.g. Call Setup such as message(s) M300, M600) for setting up a call to a terminal of the called party as a trigger to obtain the identifier (e.g. B-nbr) of the called party and to send the request (e.g. TCAP Subscribe or SIP Subscribe such as message(s) M310 or M610, respectively) for naming information of the called party to the database (e.g. NADB or PGM such as 330 or 630, respectively or database 930) wherein the naming information of the called party is registerable in association with the called party identifier, the request comprising the identifier. In response to the sending of the request (e.g. TCAP Subscribe or SIP Subscribe such as message(s) M310 or M610, respectively) for naming information, a notification (e.g. TCAP notify or SIP Notify such as message(s) M315 or M615, respectively) indicating information regarding an availability of the requested naming information at the database is received. If the availability is determined to the affirmative (which is an example for: in accordance with the indicated availability information) and after a call-termination message is received, the calling party may be interrogated for providing an acceptance specification for the naming information (e.g. USSD: "Accept vCard?" and USSD: "Yes" such as message(s) M320, M620 and M325, M625, respectively) and if the received acceptance specification is determined to be in the affirmative, the request (e.g. TCAP GET or XCAP GET such as message(s) M330 or M630, respectively) for actually transferring the naming information from the database is sent to the database. When the naming information is received, the delivery of the naming information to the mobile terminal may be executed.

The acceptance specification as well as the delivery of the naming information to the calling party mobile terminal however may happen after call termination which avoids user disturbance, e.g. as explained above. In addition the communication is effective and efficient as the availability of the naming information can be checked rather immediately at the time of the call-set-up and time until call termination may be used in order to obtain the naming information from the called party terminal or from another database. In addition, the actual release of the naming information from the database is dependent on the acceptance by the calling party. If the calling party does not want to accept the naming information of the called party, then after the reception of the negative acceptance specification, the request (e.g. TCAP GET or XCAP GET such as message(s) M330 or M630, respectively) for actually transferring the naming information from the database may be not sent. In other word, the naming information does not unnecessarily leaves the database which is of advantage from security and privacy point of view and also in terms of load of the network and the entities involved.

The invention works also if the called party terminal is busy or (if the called party) does not want to accept the call. Then, the steps of the method may be executed after the busy state or the call-non-acceptance state is determined by the switching node accordingly for sending the naming information of the called party to the calling party's mobile terminal where it can be processed as described.

A party may come from the enterprise segment such as a company or restaurant or may be an end-user. An example for a called party from the consumer segment may be an ordinary user, e.g. user Alice as calling party setting up a call to a user Bob as the called party.

Referring to the aforementioned consumer segment and in particular to the example of Alice calling Bob, the method may effect that the name of Bob may appear on the outgoing call list, e.g. phone number 0241 787 6588 may be replaced by name "Bob" such that next time Alice wants to call Bob she can turn to the outgoing cal list and click on "Bob" instead on one of the numbers presented. In addition, especially if Bob's naming information sent to Alice's mobile phone is a vCard of Bob, the vCard can be added to the address book of Alice's mobile phone. Next time she makes a call to Bob, Alice may search for Bob's entry in her address book For an end-user calling a called party coming from an enterprise segment, the end-user can clearly identify the company, restaurant etc. he called among all the other 'anonymous' numbers in the outgoing call list so they don't get drowned out and thus it is straightforward for the end-user to e.g. call the restaurant later to e.g. change the table reservation, similarly for a called party being an end-user, see also FIG. 8 for illustration.

Parts of the following description uses the enterprise segment as an example of a called party category to illustrate benefits of the intention which may as well apply if the called party comes from the consumer An embodiment for a technical realization in a legacy circuit switched (CS) mobile network is depicted in FIG. 3 schematically showing a CS calling party mobile terminal 300, a called party mobile terminal 340, an MSC 310 as an example for a CS switching node, a NADB 330 as an example for a database storing subscriber data, and a SMS-C 320 as an example for a text message delivery service center. Protocol TCAP is used on the interface between NADB 330 and MSC 310 via Signal Transfer Point (STP) 350. Furthermore, protocol MAP can be used for a delivery of vCards 380 and 390 which serve as examples for naming information of the called party to be delivered to the calling party's terminal 300 and of the calling party to be delivered to the called party's terminal 340, respectively.

The mobile operator 360 is typically in possession of the database 330 into which the details of the naming information, e.g. vCard, of the parties of the telecommunication system 3000 operated by the operator can be uploaded. Examples for parties are calling party operating calling party mobile terminal 300 or called party operating called party mobile terminal 340 or further users of the telecommunication system 3000. The uploading may be executed either by the operator 360 or by the party (such as restaurant, company etc. "owner" or the end-user) himself.

As a result of a call set-up from the calling party terminal 300 to the called party terminal 340, a vCard 380 of the called party can be delivered from the SMS-C 320 (e.g. via the MSC 310 or separate from it) to the calling party terminal 300. Similarly, a vCard 390 of the calling party can be delivered to the called party mobile terminal 340.

Figure 8:
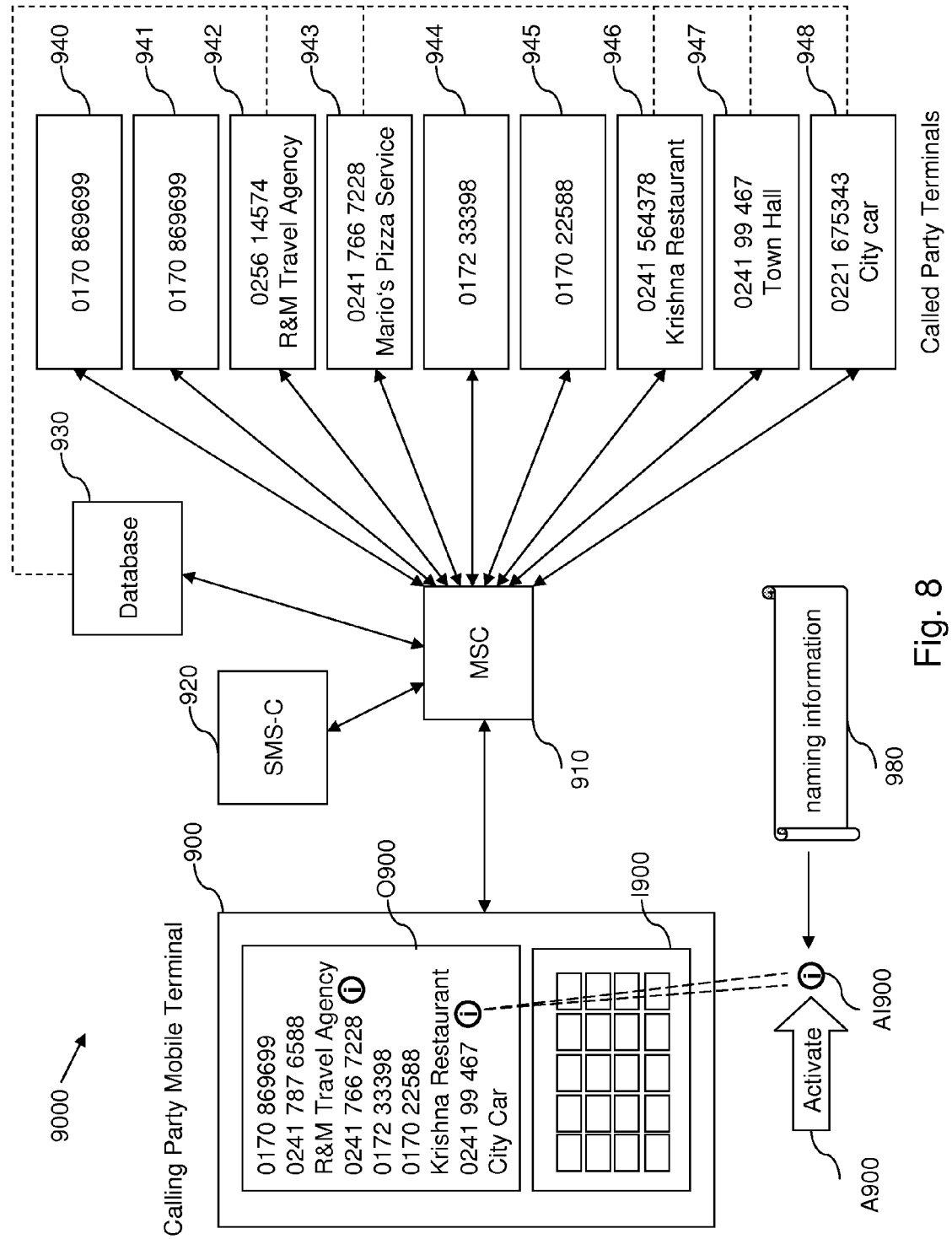
FIG. 8 shows a schematic illustration of a third embodiment of a mobile telecommunication network for implementing the invention.

In other words, a mobile phone user gets a vCard pushed onto his mobile phone upon calling a called party terminal such as a terminal of a company, restaurant etc. so that the outgoing call list could look like on the display O900 of the mobile phone 900 shown in FIG. 8.

Figure 4:
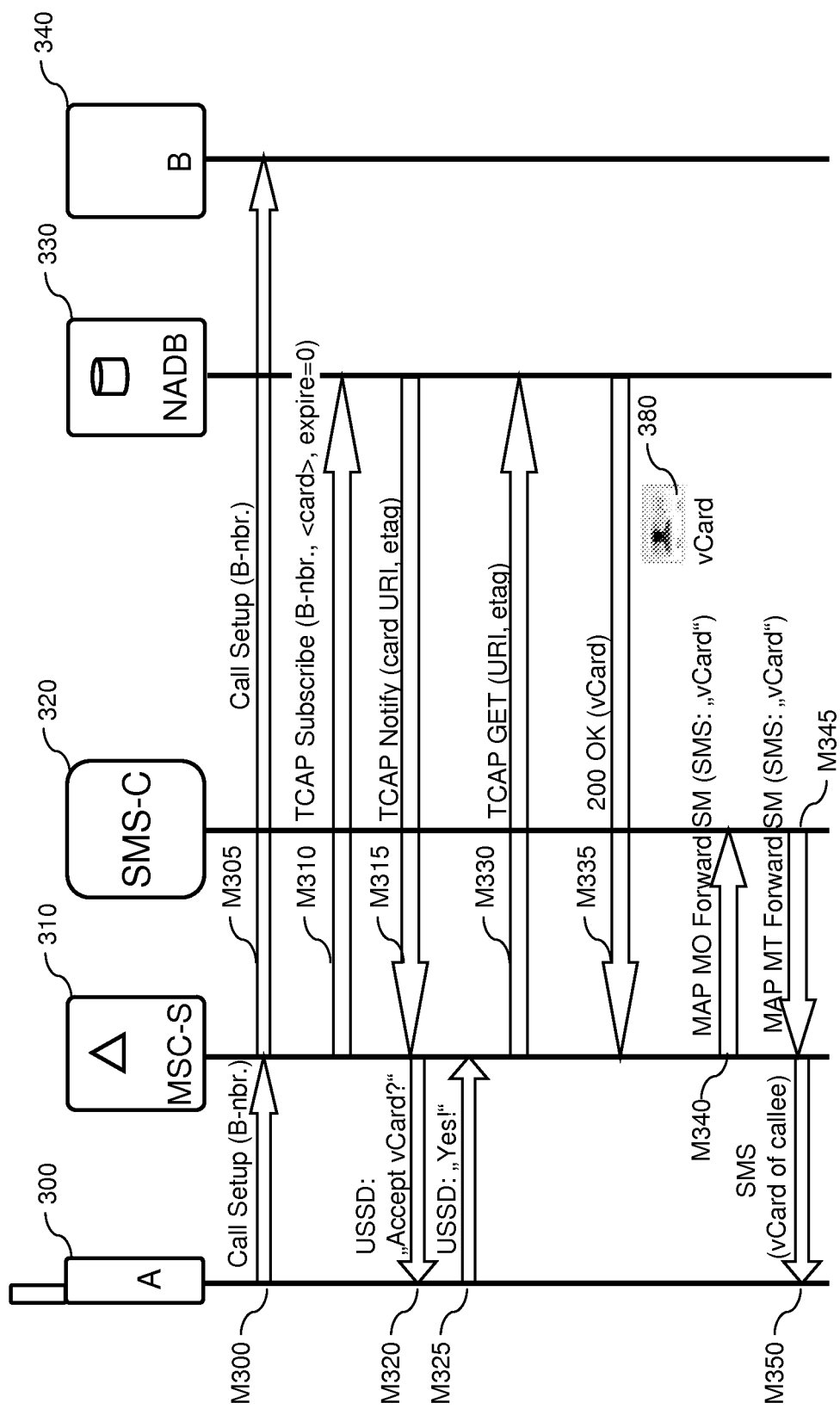
FIG. 4 shows a first example for a message sequence diagram for implementing the invention.

A first embodiment of a message flow is shown in FIG. 4 wherein a vCard 380 is delivered to a calling party terminal 300, e.g. a legacy phone.

A call from calling party mobile terminal 300 to a called party terminal 340 might be set-up as indicated by messages M300, M305. Via network signaling the MSC-S 310 checks if the called party, e.g. a restaurant or company, has registered itself in the operators name data base (NADB) 330. The check is performed by sending a TCAP Subscribe message M310 to the NADB 330. Message M310 may comprise one or more parameters to allow the NADB 330 to determine the availability of the called party's vCard 380 such as B-nbr as called party identifier. Parameter <card> may indicate that naming information is requested, in particular in form of a card such as a vCard. <card> may have one or more values to differentiate between cards of different format, content, and/or language. One or more further protocol-specific parameters may be included in message M310, here illustrated by "expire=0". If the vCard 380 is available, the NADB 330 responds with a TCAP Notify message M315 comprising a link to the vCard ("card URI") and (optionally) an etag.

If the determination of the availability is in the affirmative, the calling user is asked via USSD message M320 if he wants a vCard 380 to be pushed onto his mobile terminal 300. If the user wants this, he enters accordingly an indication of his acceptance into his mobile terminal 300 and a USSD message M325 is sent to the MSC-S 310 with the USSD message M325 comprising information specifying the calling party's acceptance to the MSC-S 310. In other words, a request for acceptance specification such as message M320 is indicated to the calling party at the calling party's terminal 300. Such an indicated request for acceptance specification may be also denoted as availability indicator, which, when activated by entering appropriate acceptance specification information (e.g. "Yes" is typed into the mobile terminal), triggers the sending of the acceptance specification such as message M625 to the switching node 310.

The MSC-S 310 thus instructed proceeds by sending a TCAP GET message M330 to the NADB 330. The TCAP GET message comprises the URI and etag received via message M315 for identifying the vCard at NADB 330. NADB 330 responds with a 200 OK message M335 comprising the vCard 380 which is sent to the mobile terminal 300 via SMS, e.g. by sending a MAP MO Forward SM message M340 comprising the vCard 380 to a SMS-C 320 which responds with a MAP MT Forward SM message M345 comprising the vCard 380. Subsequently, the vCard 380 can be delivered as SMS M350 from the MSC-S 310 to the calling party's mobile terminal 300 and processed accordingly. For example, when the SMS M350 has arrived in the mobile terminal 300, it's user might be prompted to open it. Upon doing so, a request might be displayed for the user "Save in contacts?" which the user can answer with "Yes" or "No". If answered in the affirmative, i.e. "Yes", the vCard 380 can be stored in the mobile terminal's 300 address book. Furthermore, the outgoing call list can show the explicit name of the called party (name of the called company, restaurant etc.) as indicated on the vCard 380, see also FIG. 8 depicting examples for illustration.

It is noted that legacy circuit switched mobile terminals such as mobile terminal 300 can store vCards on a Subscriber Identity Module (SIM) card, and also in their memory in the mobile terminal or attachable to the mobile terminal (e.g. on removable storage card). The address book can be stored on such a data storage medium.

Figure 9:
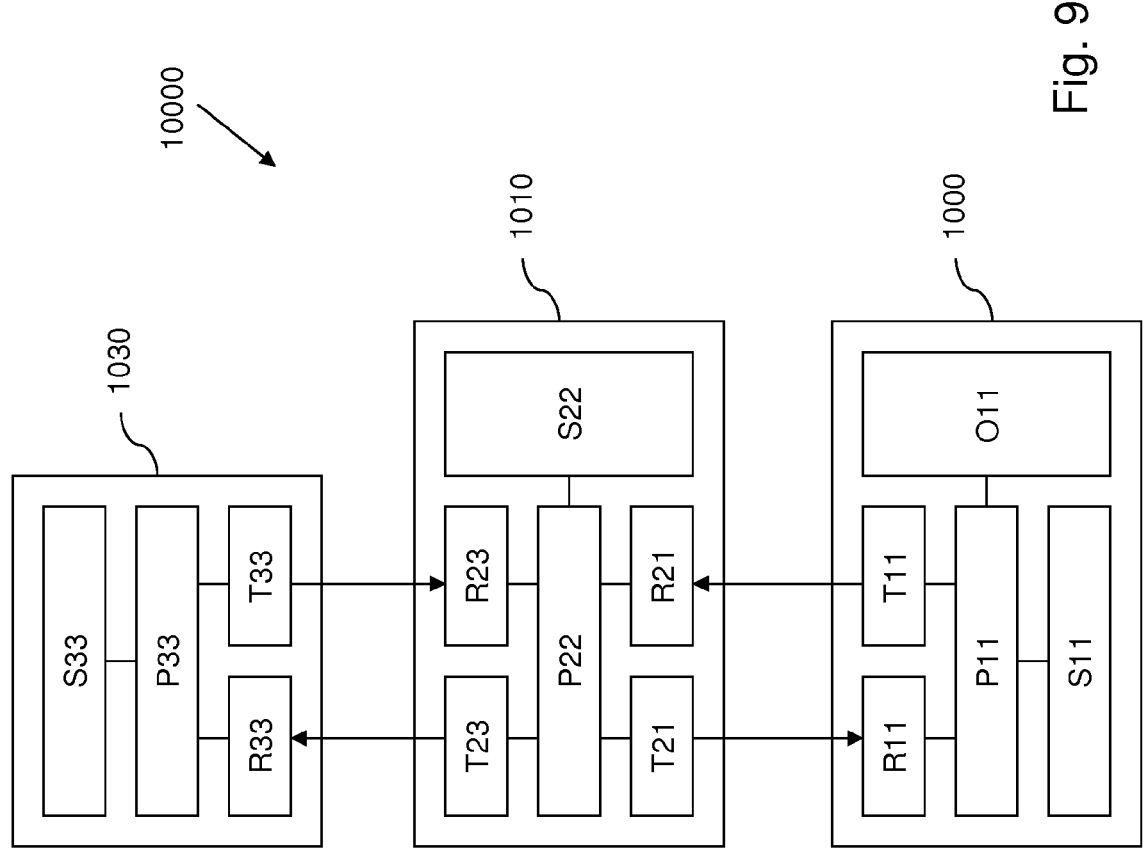
FIG. 9 shows schematic illustrations of embodiments of devices and interfaces for implementing the invention.

A processing unit on the mobile terminal, e.g. such as P11 of mobile terminal 1000 in FIG. 9, may be adapted to process address book functions, i.e. it enables the vCard management, e.g. sorting according to specific criteria, looking up vCards etc, in particular adding new vCards to the address book as well as replacing existing ones by new ones, e.g. adding vCard received via SMS to address book is a functionality already provided today my many terminals. A processing unit of a mobile terminal may be adapted to add received naming information to the address book. It is of advantage if the received naming information has a standardized and/or widely-accepted file format as the processing unit can extract data from predefined structural elements reserved for certain type of information, e.g. data first block, address second block, phone number third block etc. For extracting the name, the processing unit may turn to the first block and extract the data there from without having to process further data blocks thus saving processing effort and time and battery consumption.

It is noted that "vCard" is an existing file format standard for electronic business cards. vCards have a pre-defined structure which can contain name and address information, phone numbers, URLs, logos, photographs, and even audio clips etc. The processing unit of the mobile terminal extracts the name from the vCard and replaces the phone number(s) in the outgoing call list with the name of the vCard for which the processing unit determines matching phone number(s) in the outgoing call list and the vCard.

It is further noted, that in FIG. 3 not only the calling party mobile terminal is provided with naming information of the called party ("vCard" 380), but in addition also the called party is provided with naming information of the calling party ("vCard" 390) which is user-friendly for the called party. The naming information of the calling party may be added to the address book on the called party terminal and/or its incoming call list in a similar manner as described before for the naming information of the called party is added to the address book of the calling party and the calling party outgoing call list. Alternatively, or in addition, the name of the calling party may be indicated via CNAP IN service at the terminal of the called party.

Figure 5:
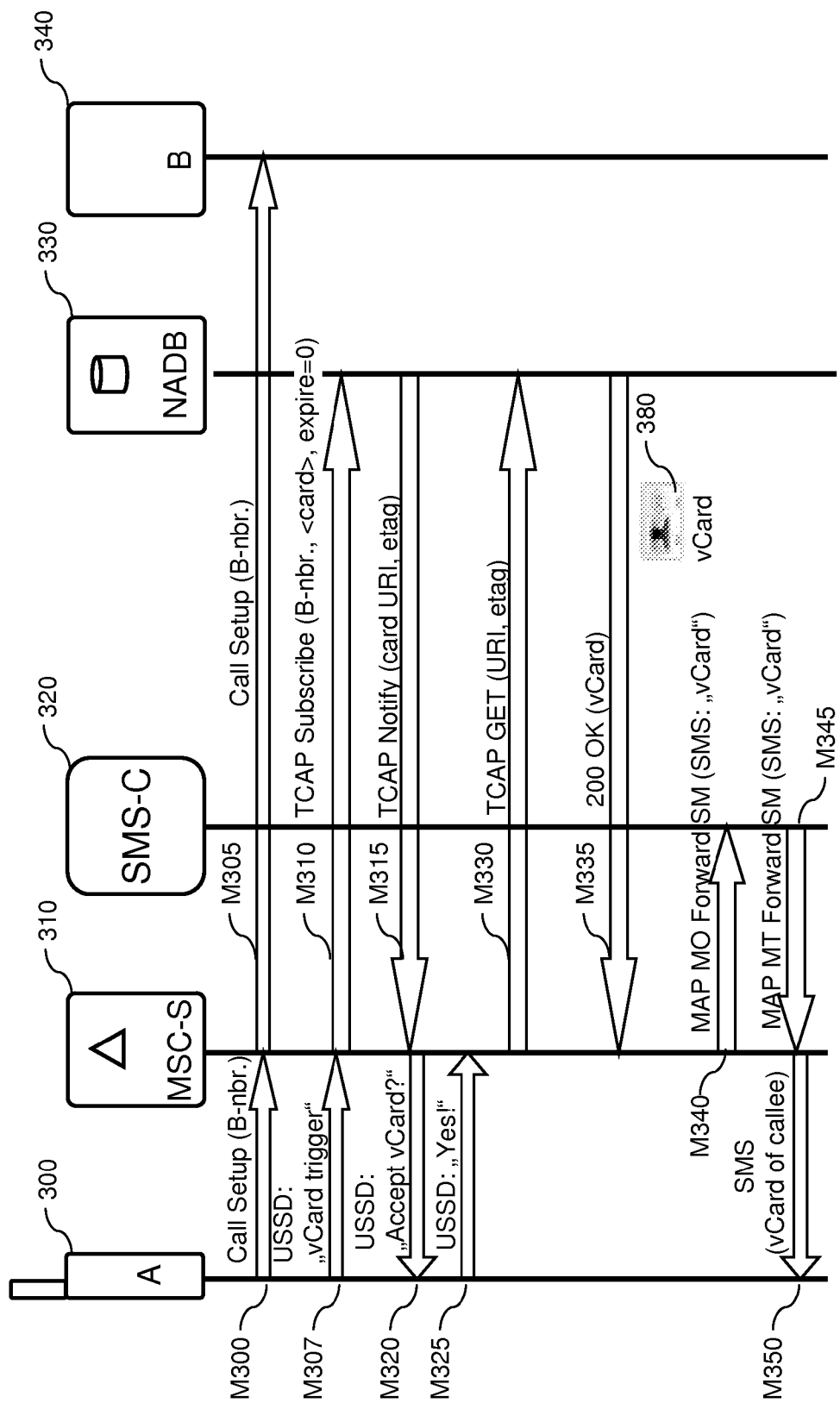
FIG. 5 shows a second example for a message sequence diagram for implementing the invention.

A second embodiment of a message flow is shown in FIG. 5. Compared to FIG. 4, the mobile terminal 300 monitors the outgoing call to the called party terminal 340. If the B-number of the called party, e.g. a restaurant, company etc., is not stored in the Address Book of the calling party's mobile terminal 300, the mobile terminal 300 triggers the vCard fetch from MSC-S310 by sending a USSD message M307 triggering the MSC-S 310 to proceed with fetching and sending the vCard 380 to the mobile terminal 300 as described in conjunction with FIG. 4. In other words, the MSC-S 310 may be triggered by the call set-up message M300 and/or a USSD trigger message M307 to proceed with messages M310-M350 for checking availability of vCard 380, fetching of vCard 380, and for sending vCard 380 as SMS to the mobile terminal 300 as described in conjunction with FIG. 4. Monitoring outgoing calls and thus sending a USSD trigger message M307 may be implemented in legacy circuit switched mobile terminals by an appropriate adaptation of the software in the mobile terminal.

In addition to the above two embodiments it is possible to implement that a vCard can as well be pushed onto an end user's mobile terminal when the company, restaurant, ticket service etc. calls the end user at first, i.e. in this scenario the company, restaurant, ticket service etc would be the calling party and the end-user the called party. Alternatively or in addition, via implementing a new menu point on the legacy mobile terminal, the user has the possibility to manually request a vCard stored inside NADB being sent onto his mobile terminal.

Figure 6:
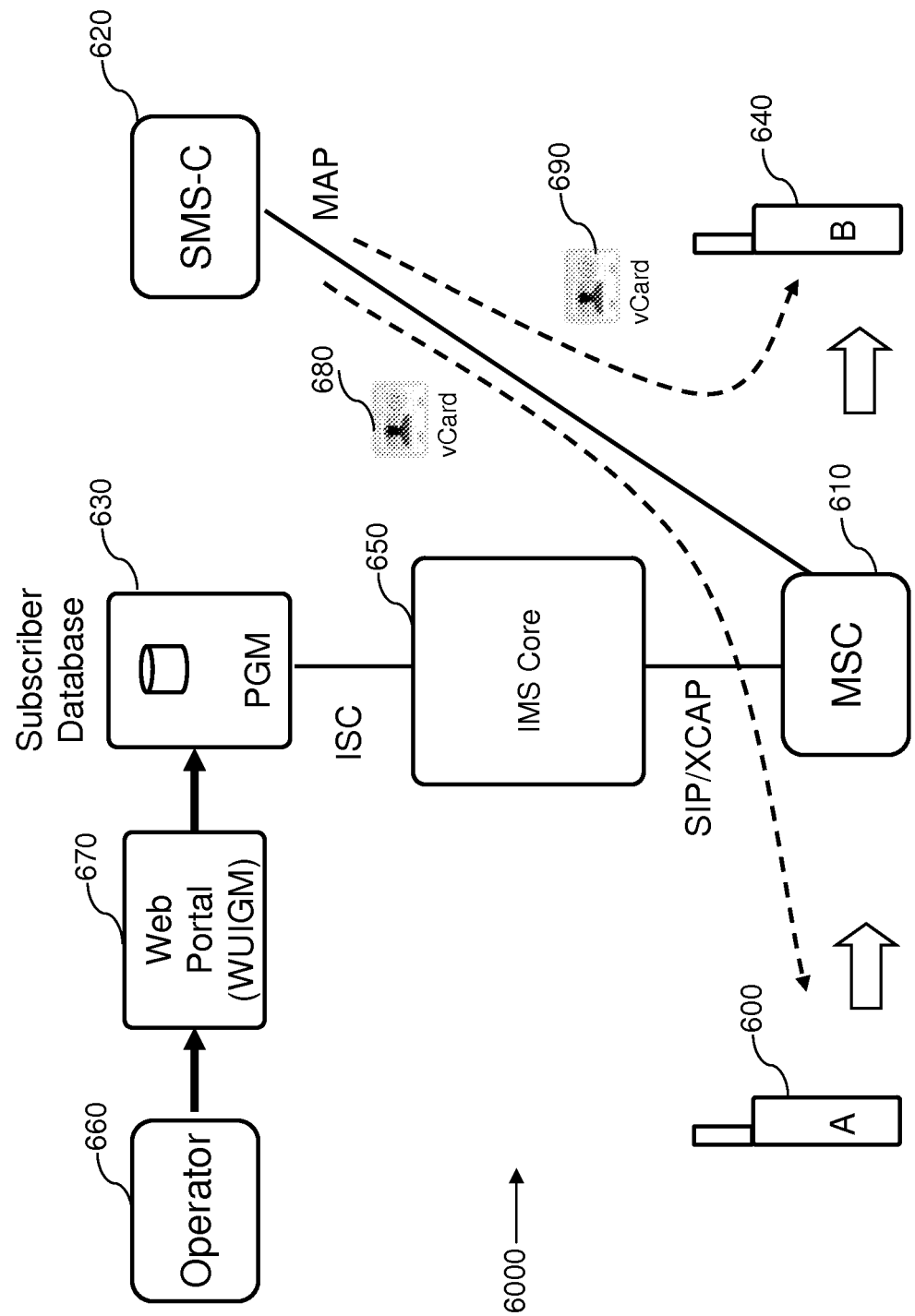
FIG. 6 shows a schematic illustration of a second embodiment of a mobile telecommunication network for implementing the invention.

An embodiment for a technical realization in an IMS-based mobile core network is depicted in FIG. 6. schematically showing a Rich Communication Suite (RCS) enabled calling party mobile terminal 600, a called party mobile terminal 640, an MSC 610 as an example for a CS switching node, a PGM 630 as an example for a database storing subscriber data, and a SMS-C 620 as an example for a text message delivery service center. IP multimedia Subsystem Service Control (ISC) may be used as interface between PGM 630 and IMS Core network 650 and further protocol SIP/XCAP on the interface between IMS Core network 650 and MSC 610. Furthermore, protocol MAP can be used for a delivery of vCards 680 and 690 which serve as examples for naming information of the called party to be delivered to the calling party's terminal 600 and of the calling party to be delivered to the called party's terminal 640, respectively.

The mobile operator 660 is typically in possession of the database PGM 630 into which the details of the naming information, e.g. vCard, of the parties of the telecommunication system 6000 operated by the operator can be uploaded. Examples for parties are calling party operating calling party mobile terminal 600 or called party operating called party mobile terminal 640 or further users of the telecommunication system 6000. The uploading may be executed either by the operator 660 via web portal 670, e.g. a Web User Interface for Group and Data Management (WUIGM), or by the party (such as restaurant, company etc. "owner" or the end-user) himself, e.g. via web portal 670 or other portals.

As a result of a call-set-up from the calling party terminal 600 to the called party terminal 640, a vCard 680 of the called party can be delivered from the SMS-C 620 (e.g. via the MSC 610 or separate from it) to the calling party terminal 600. Similarly, a vCard 690 of the calling party can be delivered to the called party mobile terminal 640.

In other words, a mobile terminal user gets a vCard pushed onto his mobile terminal upon calling a called party terminal such as a terminal of a company, restaurant etc. so that the outgoing call list could look like on the display O900 of the mobile terminal 900 shown in FIG. 8.

Figure 7:
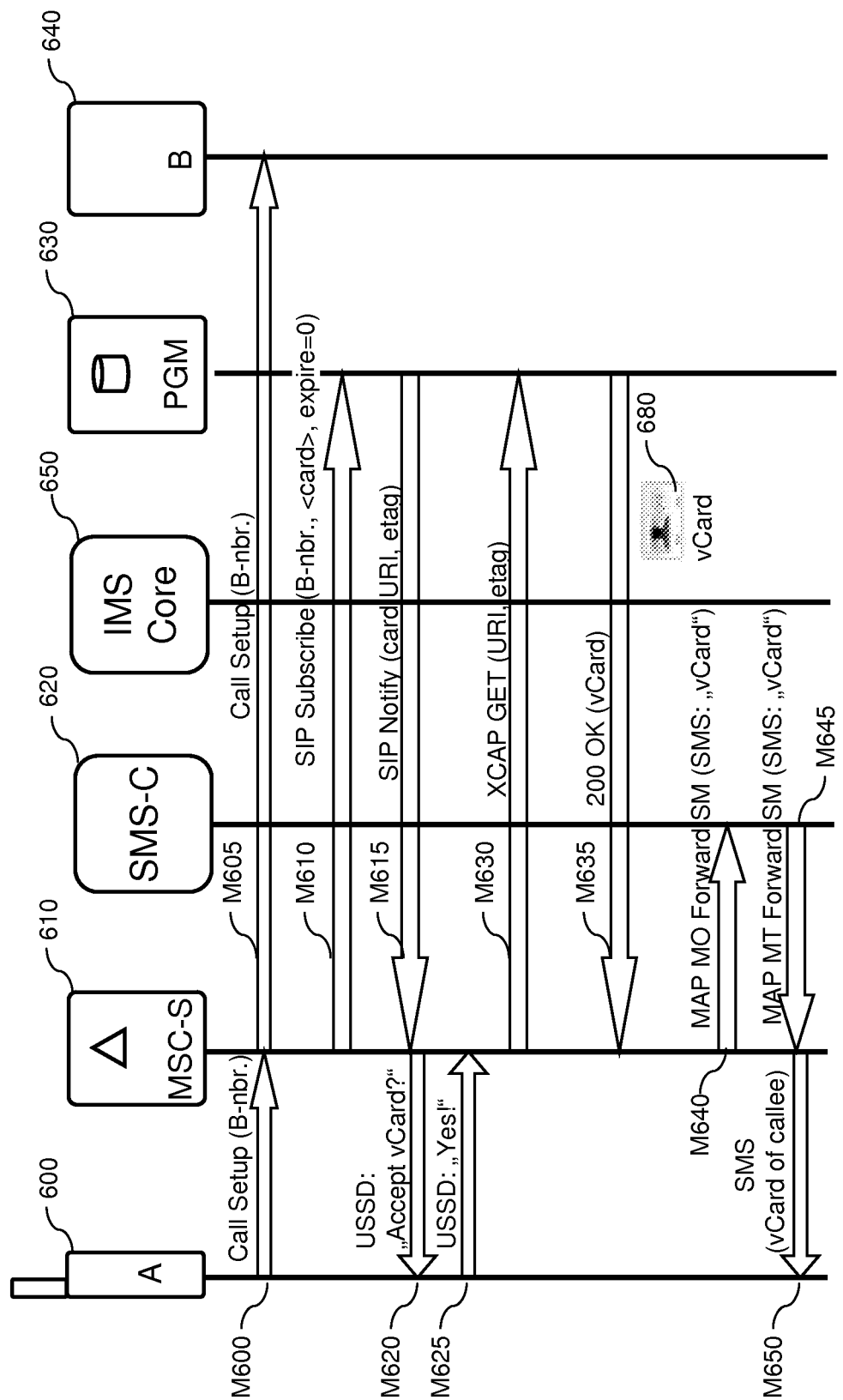
FIG. 7 shows a third example for a message sequence diagram for implementing the invention.

An embodiment of a message flow for a network comprising an IMS core network 650 is shown in FIG. 7 wherein a vCard 680 is delivered to a calling party terminal 600, e.g. a legacy phone with RCS.

A call from a calling party mobile terminal 600 to a called party terminal 640 might be set-up as indicated by messages M600, M605.

Via network signaling the MSC-S 610 checks if the called party, e.g. a restaurant or company, has registered itself in the PGM 630. The check is performed by sending a SIP Subscribe message M610 to the PGM 630. Message M610 may comprise one or more parameters to allow the PGM 630 to determine the availability of the called party's vCard 680 such as B-nbr as called party identifier. Parameter <card> may indicate that naming information is requested, in particular in form of a card such as a vCard. <card> may have one or more values to differentiate between cards of different format, content, and/or language. One or more further protocol-specific parameters may be included in message M610, here illustrated by "expire=0". If the vCard 680 is available, the PGM 630 responds with a SIP Notify message M315 comprising a link to the vCard ("card URI") and (optionally) an etag.

If the determination of the availability is in the affirmative, the calling user is asked via USSD message M620 if he wants a vCard 680 to be pushed onto his mobile terminal 600. If the user wants this, he enters accordingly an indication of his acceptance into this mobile terminal 600 and a USSD message M625 is sent to the MSC-S 610 with the USSD message M625 comprising information specifying the calling party's acceptance to the MSC-S 610. In other words, a request for acceptance specification such as message M620 is indicated to the calling party at the calling party's terminal 600. Such an indicated request for acceptance specification may be also denoted as availability indicator, which, when activated by entering an appropriate acceptance specification information, triggers the sending of the acceptance specification such as message M625 to the switching node 610.

The MSC-S 610 thus instructed proceeds by sending a XCAP GET message M630 to the PGM 630. The XCAP GET message comprises the URI and etag received via message M615 for identifying the vCard at PGM 630. PGM 630 responds with a 200 OK message M635 comprising the vCard 680 which may be sent to the mobile terminal 600 via SMS, e.g. by sending a MAP MO Forward SM message M640 comprising the vCard 680 to a SMS-C 620 which responds with a MAP MT Forward SM message M645 comprising the vCard 680. Subsequently, the vCard 680 can be delivered as SMS from the MSC-S610 to the calling party's mobile terminal 600 and processed accordingly. For example, when the SMS M650 has arrived in the mobile terminal 600, it's user will be prompted to open it. Upon doing so a request may be displayed to the user asking the user "Save in contacts?", which the user can answer with "Yes" or "No". If answered in the affirmative, i.e. "Yes", the vCard 680 can be stored in the mobile terminal's 600 address book. Furthermore, the outgoing call list can show the explicit name of the called party (name of the called company, restaurant etc.) as indicated on the vCard 680, see also FIG. 8 depicting examples for illustration.

Hence, the message flows of FIG. 4 and FIG. 7 can be regarded principally the same except that e.g. IP based protocols (SIP, XCAP) are used plus a PGM database suited to the advanced services in IMS. By that also IMS-based networks can be addressed by the invention. In a similar manner, a dedicated USSD vCard trigger message such as message M307 in FIG. 5 may be introduced into an IMS-based network solution for introducing a calling party mobile terminal triggered vCard fetching and sending.

FIG. 8 shows a telecommunication system 9000 comprising inter alia a calling party mobile terminal 900 comprising an output unit O900, e.g. a display, and an input unit I900, e.g. a keyboard. Furthermore a number of called party terminals 940-948 are shown. For each of called party terminals 940-948, the respective phone number is indicated. Some of the called parties have registered their naming information at a database 930, so as indicated for called party terminals 942, 943, 946-948. The calling party terminal 900 set-up phone calls (successfully or not) via MSC 910 to each of the called party terminals 940-948. The phone calls (or attempts) are indicated by the outgoing call list on the output unit O900. The outgoing call list shows for those called party terminals 940, 941, 944, 945 for which no registration of their respective called party in terms of naming information and party identifier exists at the database 930 each respective called party's phone number. Delivery of naming information according to the invention is provided for those calls or call attempts to those called party terminals 942, 943, 946-948 that have such a registration of their respective party at the database 930. Phone numbers of called parties using called party terminals 942, 946 948 have been replaced by naming information delivered by SMS in accordance with embodiments of the invention, e.g. as described in conjunction with FIGS. 1-7, and 9. Phone numbers for terminals 943, 947 as indicated on the output unit O900 are associated with an availability indicator AI900. The availability indicator AI900 may be any kind of icon such as picture, letter, or symbol, e.g. as indicated by a circled 1, or the like for indicating to the user of calling party terminal 900 the availability of naming information of the respective called party. Activation of the availability indicator by an input command via input unit I900, e.g. pressing a key of the keyboard, will trigger a sending of an acceptance specification such as a USSD: "Yes" message M325, M625 for initiating the fetching of the called party naming information 980 from the database 930 to the MSC 910 and further the sending of the naming information 980 to the mobile terminal 900 via the SMC 920 in accordance with embodiments of the invention, e.g. as described in conjunction with FIGS. 1-7, and 9. The user of calling party terminal 900 may activate the availability indicator AI900 associated to the phone number of called party operating called party terminal 947 resulting in the delivery of the naming information "Town Hall" to the calling party terminal 900 and a replacement of "0241 99467" by "Town Hall". For the other one for terminal 943 the user may not activate the availability indicator associated to "0241 766 7228" resulting in that no naming information is delivered for this phone number according to this mechanism.

In that sense, an activation/non-activation of the availability indicator may comprise a multiple step procedure, e.g. a first step such as a clicking on the availability indicator may open a dialog window asking the user of terminal 900 explicitly if the naming information of the called party should be delivered to the terminal 900. If answer in the affirmative, e.g. by entering "yes" into or pressing a pre-defined key on the input unit I900 as a second step, the acceptance specification will be sent accordingly resulting in a delivery of the naming information and replacement of the phone number by e.g. called party's name. Afterwards, the availability indicator may disappear from the outgoing call list.

If the answer is not in the affirmative, e.g. by entering "no" into or by pressing another pre-defined key on the input unit I900 as second step, a negative acceptance specification may be sent accordingly resulting in no delivery of the naming information and thus no replacement of the phone number by e.g. called party's name. Afterwards, the availability indicator may disappear from the outgoing call list.

The invention may provide an address book-like feature enrichment for legacy mobile phones that can be deployed in existing circuit switched mobile networks, sometimes also called pre-IMS networks, as well as for IMS core networks.

The naming information may be automatically inserted into the address book on the calling party mobile terminal. Afterwards, the explicit name of the called parties may be pushed into the calling party mobile terminal's outgoing call list and not just the number of the called party which get's gradually drowned as the list of called party numbers grows.

Thus, the invention can enrich the user friendliness of mobile phones, e.g. when having made a phone call (attempt) to a called party, the user can call the name as delivered by the invention rather than a lengthy and difficult to remember number of a previously called party. Hence, mobile phone usage for end-users as well as enterprises is increased and thus operator network utilization.

The description sometimes refers to legacy phones which are a kind of traditional or conventional circuit-switched phones without rich communication suite (RCS) features. RCS enabled phones are an example of rather modern circuit-switched mobile terminals that provide RCS functionality. Examples for circuit-switched mobile terminals are mobile devices like mobile phones, smart phones, or laptop computers that are capable to communicate via CS communication via a radio network with a circuit switched switching node. In addition to this capability, a mobile terminal may be adapted to communicate also according to further communication techniques, e.g. package-switched based. An example for a circuit-switched switching node is a MSC-S, sometimes also denoted as MSC. Further terms and abbreviations used herein are explained in the glossary below.

FIG. 9 shows schematic illustrations of embodiment of devices and interfaces for implementing the invention. Depicted is an embodiment of a telecommunication system 10000 comprising in particular a circuit switched mobile terminal 1000, a circuit switched switching node 1010 and a called party naming information database S22, S33.

The switching node 1010 may comprise a receiving unit R21, R23 for receiving messages, a transmitting unit T21, T23 for sending messages, and a processing unit P22 for processing messages and information. Information may be stored in or retrieved from a database S22. The called party naming database may be internal to the switching node 1010, e.g. database S22, or external to the switching node 1010, e.g. database S33. The external database S33 may be included or attached to a device 1030 comprising respective receiving and transmitting units R33 and T33 for communicating with the switching node 1010 or further network entities and typically a processing unit P33 for internal device 1030 data processing. The processing unit P22 may be adapted to request and receive naming information of the called party from the external database S33 via transmitting unit T23 and receiving unit R23, respectively. Alternatively or in addition, the processing unit P22 may be adapted to request naming information of the called party from an internal database S22. In the case of the internal database S22, the receiving unit R23 and the transmitting unit T23 may be units adapted to switching node 1010 internal communication.

According to an embodiment of the switching node 1010, the receiving unit R21 may be adapted to receive from the mobile terminal 1000 a request for setting up a call to a terminal of the called party. The processing unit P22 may be adapted to obtain an identifier of the called party, e.g. from the received request. The transmitting unit T23 may be adapted to send a request for naming information of the called party to a database S22, S33 wherein the naming information of the called party is registerable in association with the called party identifier, the request comprising the identifier. Furthermore, the receiving unit R23 is adapted to receive the naming information from the database S22, S33 and the processing unit P22 is adapted to execute a delivery of the naming information to the mobile terminal at least via transmitting unit T21. The respective units P22, S22, T21, R21, T23, or R23 may be adapted to perform further steps of the method for the switching node, in particular those described in conjunction with FIG. 1.

The mobile terminal 1000 may comprise a receiving unit R11 for receiving messages, a transmitting unit T11 for sending messages, and a processing unit P11 for processing messages and information. Information may be stored in or retrieved from a database S11. The mobile terminal 1000 may further comprise an output unit O11 for presenting the received called party naming information to the calling party, e.g. a display of a mobile phone showing an outgoing call list as in FIG. 8.

According to an embodiment of the mobile terminal 1000, the transmitting unit T11 may be adapted to send to a circuit-switched switching node 1010 a request for setting up a call to a terminal of the called party. The receiving unit R11 may be adapted to receive from the switching node 1010 naming information of the called party. The mobile terminal 1000 may further comprise an output unit O11 for presenting the received called party naming information to the calling party, e.g. a display of a mobile terminal showing an outgoing call list as in FIG. 8. The processing unit P11 may be adapted to process the received naming information, e.g. to store it in the database S11 and/or to replace a called party identifier of a called party in an outgoing call list by received naming information of said called party (B-nbr to name replacement). The respective units P11, S11, T11, R11, or O11 may be adapted to perform further steps of the method for the mobile terminal, in particular those described in conjunction with FIG. 2.

The present invention also concerns computer programs comprising portions of software codes in order to implement the methods as described above when operated at a circuit-switched switching node and a mobile terminal, respectively. The computer programs can be stored on computer readable media. A computer-readable medium can be a permanent or rewritable memory within the switching node or the mobile terminal or located externally. The computer program can be also transferred to the switching node or the mobile terminal for example via a cable or a wireless link as a sequence of signals.

The invention claimed is:

1. A method for providing naming information of a called party to a circuit-switched mobile terminal of a calling party via a mobile telecommunication network, the method performed by a circuit-switched switching node and comprising:
   receiving from the mobile terminal a request for setting up a call to a terminal of the called party;
   obtaining an identifier of the called party;
   receiving an acceptance specification from the mobile terminal specifying information regarding an acceptance for the delivery of the naming information to the mobile terminal;
   sending a request for naming information of the called party to a database wherein the naming information of the called party is registerable in association with the called party identifier, the request comprising the identifier;
   receiving the naming information from the database;
   executing a delivery of the naming information to the mobile terminal; and
   determining a termination of the call, a busy state of the called party terminal, and a call-non-acceptance state by the called party terminal, and wherein said determining triggers:
   said sending of said request to the database;
   sending a request for said acceptance specification to the mobile terminal; and
   said executing said delivery of the naming information to the mobile terminal.

2. The method according to claim 1, wherein the request from the mobile terminal comprises the identifier and the identifier is obtained by the switching node from said request.

3. The method according to claim 1, further comprising receiving a request for the naming information from the mobile terminal, and wherein receiving said request for the naming information triggers said sending of the request for the naming information of the called party to the database.

4. The method according to claim 1, further comprising:
   receiving in response to the sending of the request for naming information a notification indicating information regarding an availability of the requested naming information at the database; and
   sending a request for actually transferring the naming information from the database in accordance with the indicated availability information.

5. The method according to claim 1, further comprising:
   sending an identifier of the calling party to the database wherein the naming information of the called party is stored in association with the calling party identifier, and
   receiving from the database a notification comprising a delivery status of the requested naming information to the mobile terminal.

6. The method according to claim 1, wherein the request for acceptance specification triggers the mobile terminal to indicate an availability indicator of the called party naming information associated with the called party identifier.

7. The method according to claim 6, wherein an activation of the availability indicator triggers the sending of the acceptance specification from the mobile terminal.

8. The method according to claim 1, further comprising obtaining an identifier uniquely identifying the call to the mobile terminal and wherein executing said delivery comprises delivering the called party naming information and the call identifier so as to allow the mobile terminal to associate the called party naming information with the call to the calling party.

9. The method according to claim 1, wherein executing said delivery comprises delivering the called party naming information and the called party identifier so as to allow the mobile terminal to associate the called party naming information with the called party identifier.

10. The method according to claim 1, wherein executing said delivery comprises:
sending the naming information in a format suited for incorporation in a text message to a text message delivery service center;
receiving from the text message delivery service center a text message comprising the naming information; and
sending the text message to the mobile terminal.

11. The method according to claim 1, further comprising:
obtaining naming information of the calling party and an identifier of the calling party; and
sending the calling party naming information and the calling party identifier to the database so as to allow to associate the calling party naming information with the calling party identifier for registering the calling party at the database.

12. The method according to claim 1, wherein the naming information of the called party includes one or more names of the called party, wherein said one or more names include at least one real name of or nickname for the called party.

13. The method according to claim 1, further comprising determining based on the acceptance specification whether naming information is to be delivered to the mobile terminal, and performing said sending of the request, receiving of the naming information, and executing delivery of the naming information responsive to determining that the naming information is to be delivered to the mobile terminal.

14. A method for providing naming information of a called party to a circuit-switched mobile terminal of a calling party via a mobile telecommunication network, the method performed by the circuit-switched mobile terminal and comprising:
sending to a circuit-switched switching node a request for setting up a call to a terminal of the called party, wherein the request comprises an identifier of the called party;
sending to the switching node an acceptance specification specifying information regarding an acceptance for the delivery of the naming information to the mobile terminal;
sending a request for the naming information to the switching node for triggering the switching node to request the naming information of the called party at a database wherein the naming information of the called party is registerable in association with a called party identifier; and
receiving from the switching node naming information of the called party via the database;
wherein, after a termination of the call, a busy state of the called party terminal, and a call-non-acceptance state by the called party terminal is determined, wherein said determining triggers:
said sending of said request for the naming information to the database;
receiving a request for said acceptance specification; and
receiving from the switching node said naming information and executing the delivery of said naming information.

15. The method according to claim 14, wherein the receiving of the request for the acceptance specification is from the switching node.

16. The method according to claim 15, wherein the request for acceptance specification triggers the mobile terminal to indicate an availability indicator of the called party naming information associated with the called party identifier.

17. The method according to claim 16, wherein an activation of the availability indicator triggers the sending of the acceptance specification to the circuit-switched network node.

18. The method according to claim 14, further comprising obtaining an identifier uniquely identifying the call to the mobile terminal, wherein receiving the naming information comprises receiving the call identifier, and wherein the method further comprises associating the called party naming information with the call to the calling party based on a matching of the obtained identifier and the received call identifier.

19. The method according to claim 14, wherein receiving the naming information comprises receiving the called party identifier, and wherein the method further comprises associating the called party naming information with a called party identifier associated with the call at the mobile terminal based on a matching of the obtained called party identifier and the received called party identifier.

20. The method according to claim 14, wherein receiving the naming information comprises receiving from the switching node a text message comprising the naming information.

21. The method according to claim 14, further comprising:
obtaining naming information of the calling party and an identifier of the calling party; and
sending the calling party naming information and the calling party identifier to the database so as to allow to associate the calling party naming information with the calling party identifier for registering the calling party at the database.

22. The method according to claim 14, wherein the naming information of the called party includes one or more names of the called party, wherein said one or more names include at least one real name of or nickname for the called party.

23. The method according to claim 14, further comprising presenting the naming information of the called party in an entry for said call in an outgoing call list of the calling party's mobile terminal, rather than or in addition to a called number of the called party.

24. The method according to claim 14, further comprising determining whether the mobile terminal is roaming, generating the acceptance specification to indicate acceptance of delivery of naming information to the mobile terminal when the mobile terminal is not roaming, and to indicate non-acceptance of delivery of naming information to the mobile terminal when the mobile terminal is roaming, and wherein said receiving is performed when the mobile terminal is not roaming.

25. A circuit-switched switching node for providing naming information of a called party to a circuit-switched mobile terminal of a calling party via a mobile telecommunication network, the circuit-switched switching node comprising:
- a first receiving circuit configured to receive from the mobile terminal a request for setting up a call to a terminal of the called party, and to receive an acceptance specification from the mobile terminal specifying information regarding an acceptance for the delivery of the naming information to the mobile terminal;
- a processing circuit configured to obtain an identifier of the called party;
- a first transmitting circuit configured to send a request for naming information of the called party to a database wherein the naming information of the called party is registerable in association with the called party identifier, the request comprising the identifier;
- a second receiving circuit configured to receive the naming information from the database; and
- wherein the processing circuit is further configured to execute a delivery of the naming information to the mobile terminal, at least via a second transmitting circuit;
- wherein the processing circuit is configured to determine a termination of the call, a busy state of the called party terminal, and a call-non-acceptance state by the called party terminal, and wherein said determining triggers:
- said sending of said request for naming information;
- sending a request for said acceptance specification to the mobile terminal; and
- said executing said delivery of the naming information to the mobile terminal.

26. The circuit-switched switching node according to claim 25, wherein the request from the mobile terminal comprises the identifier and the identifier is obtained by the switching node from said request.

27. The circuit-switched switching node according to claim 25, wherein the first receiving circuit is further configured to receive a request for the naming information from the mobile terminal, and wherein receiving said request for the naming information triggers said sending of the request for the naming information of the called party to the database.

28. The circuit-switched switching node according to claim 25, wherein the second receiving circuit is configured to receive in response to the sending of the request for naming information a notification indicating information regarding an availability of the requested naming information at the database, and wherein the first transmitting circuit is configured to send a request for actually transferring the naming information from the database in accordance with the indicated availability information.

29. The circuit-switched switching node according to claim 25, wherein the first transmitting circuit is configured to send an identifier of the calling party to the database wherein the naming information of the called party is stored in association with the calling party identifier, and wherein the second receiving circuit is configured to receive from the database a notification comprising a delivery status of the requested naming information to the mobile terminal.

30. The circuit-switched switching node according to claim 25, wherein the request for acceptance specification triggers the mobile terminal to indicate an availability indicator of the called party naming information associated with the called party identifier.

31. The circuit-switched switching node according to claim 30, wherein an activation of the availability indicator triggers the sending of the acceptance specification from the mobile terminal.

32. The circuit-switched switching node according to claim 25, wherein the processing circuit is configured to obtain an identifier uniquely identifying the call to the mobile terminal and to deliver the called party naming information and the call identifier so as to allow the mobile terminal to associate the called party naming information with the call to the calling party.

33. The circuit-switched switching node according to claim 25, wherein the processing circuit is configured to deliver the called party naming information and the called party identifier so as to allow the mobile terminal to associate the called party naming information with the called party identifier.

34. The circuit-switched switching node according to claim 25, wherein the processing circuit is configured to:
- send the naming information in a format suited for incorporation in a text message to a text message delivery service center;
- receive from the text message delivery service center a text message comprising the naming information; and
- send the text message to the mobile terminal.

35. The circuit-switched switching node according to claim 25, wherein the processing circuit is configured to:
- obtain naming information of the calling party and an identifier of the calling party; and
- send the calling party naming information and the calling party identifier to the database so as to allow to associate the calling party naming information with the calling party identifier for registering the calling party at the database.

36. The circuit-switched switching node according to claim 25, wherein the processing circuit is configured to determine based on the acceptance specification whether naming information is to be delivered to the mobile terminal, and wherein the first transmitting circuit is configured to send the request, the second receiving circuit is configured to receive the naming information, and the processing circuit is configured to execute the delivery of the naming information responsive to the processing circuit's determination that the naming information is to be delivered to the mobile terminal.

37. A circuit-switched mobile terminal of a calling party for providing naming information of a called party to the mobile terminal via a mobile telecommunication network, the mobile terminal comprising:
- a transmitting circuit configured to:
  - send to a circuit-switched switching node a request for setting up a call to a terminal of the called party, wherein the request comprises an identifier of the called party;
  - send to the switching node an acceptance specification specifying information regarding an acceptance for the delivery of the naming information to the mobile terminal; and
  - send a request for the naming information to the switching node for triggering the switching node to request the naming information of the called party at a database wherein the naming information of the called party is registerable in association with a called party identifier;
- a receiving circuit configured to receive from the switching node naming information of the called party; and
- a processing circuit is configured to determine after a termination of the call, a busy state of the called party terminal and a call-non-acceptance state by the called party terminal, wherein said determining triggers:
  - sending of said request for the naming information to the database;

receiving a request for said acceptance specification; and receiving said naming information from the switching node and executing the delivery of said naming information.

38. The mobile terminal according to claim 37, wherein the receiving circuit is configured to receive from the switching node the request for the acceptance specification.

39. The mobile terminal according to claim 38, wherein the request for the acceptance specification triggers the mobile terminal to indicate an availability indicator of the called party naming information associated with the called party identifier.

40. The mobile terminal according to claim 39, wherein an activation of the availability indicator triggers the sending of the acceptance specification to the circuit-switched network node.

41. The mobile terminal according to claim 37, wherein the processing circuit configured to obtain an identifier uniquely identifying the call to the mobile terminal, wherein the receiving circuit is configured to receive the call identifier, and wherein the processing circuit is configured to associate the called party naming information with the call to the calling party based on a matching of the obtained identifier and the received call identifier.

42. The mobile terminal according to claim 37, wherein the receiving circuit is configured to receive the called party identifier, and wherein the processing circuit is configured to associate the called party naming information with a called party identifier associated with the call at the mobile terminal based on a matching of the obtained called party identifier and the received called party identifier.

43. The mobile terminal according to claim 37, wherein the receiving circuit is configured to receive from the switching node a text message comprising the naming information.

44. The mobile terminal according to claim 37, wherein the processing circuit is configured to:

obtain naming information of the calling party and an identifier of the calling party; and send the calling party naming information and the calling party identifier to the database so as to allow to associate the calling party naming information with the calling party identifier for registering the calling party at the database.

45. The mobile terminal according to claim 37, wherein the mobile terminal further comprises an output circuit for presenting the received called party naming information.

46. The circuit-switched mobile terminal according to claim 37, wherein the processing circuit is configured to determine whether the mobile terminal is roaming, generate the acceptance specification to indicate acceptance of delivery of naming information to the mobile terminal when the mobile terminal is not roaming, and to indicate non-acceptance of delivery of naming information to the mobile terminal when the mobile terminal is roaming, and wherein the receiving circuit is configured to receive the naming information when the mobile terminal is not roaming.

47. The circuit-switched mobile terminal according to claim 37, wherein the processing circuit is configured to generate the acceptance specification to selectively indicate whether the calling party accepts naming information on a call by call basis so as to indicate that the calling party accepts naming information for some calls or some called parties, but not others.

* * * * *